US010949505B2

(12) United States Patent
Dargar et al.

(10) Patent No.: US 10,949,505 B2
(45) Date of Patent: Mar. 16, 2021

(54) COMPUTER SYSTEM PROVIDING VIRTUAL COMPUTING SESSION LICENSE DISTRIBUTION FEATURES AND RELATED METHODS

(71) Applicant: CITRIX SYSTEMS, INC, Fort Lauderdale, FL (US)

(72) Inventors: Chinmay Dargar, Karnataka (IN); Bruce Fortune, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 414 days.

(21) Appl. No.: 15/636,861

(22) Filed: Jun. 29, 2017

(65) Prior Publication Data

US 2019/0005205 A1  Jan. 3, 2019

(51) Int. Cl.
*G06F 21/10* (2013.01)
*G06F 21/12* (2013.01)
*G06Q 30/06* (2012.01)

(52) U.S. Cl.
CPC .......... *G06F 21/105* (2013.01); *G06F 21/121* (2013.01); *G06Q 30/06* (2013.01)

(58) Field of Classification Search
CPC ...... G06Q 30/06; G06F 21/105; G06F 21/121
USPC .......................................................... 705/59
See application file for complete search history.

(56) References Cited

U.S. PATENT DOCUMENTS

| | | | | |
|---|---|---|---|---|
| 6,189,146 B1* | 2/2001 | Misra | .................... | G06F 21/105 705/59 |
| 7,035,918 B1* | 4/2006 | Redding | ............... | G06F 21/105 370/352 |
| 7,231,370 B1* | 6/2007 | Kapur | .................... | G06Q 10/10 705/59 |
| 9,354,928 B1* | 5/2016 | Buchheit | ............... | G06F 9/5044 |
| 2004/0102987 A1* | 5/2004 | Takahashi | ............... | G06F 21/10 705/59 |
| 2018/0287893 A1* | 10/2018 | O'Brien | ............. | H04L 41/5048 |

OTHER PUBLICATIONS

In Search of an Understandable Consensus Algorithm, Diego Ongaro, John Ousterhout, May 20, 2014 (Year: 2014).*

(Continued)

*Primary Examiner* — Steven S Kim
*Assistant Examiner* — Zesheng Xiao
(74) *Attorney, Agent, or Firm* — Allen, Dyer, Doppelt + Gilchrist, PA (57) ABSTRACT

A system may include a license publishing server and a plurality of licensing servers arranged in a cluster and configured to communicate with the license publishing server to obtain a given number of authorized licenses for virtual computing sessions associated with the cluster. The system may also include a plurality of virtualization servers configured to obtain authorized licenses from the plurality of licensing servers and run virtual computing sessions for client computing devices based upon the authorized licenses. The licensing servers may cooperate with one another to distribute licenses to the virtualization servers based upon a consensus protocol and the given number of authorized licenses associated with the cluster.

16 Claims, 6 Drawing Sheets

(56) References Cited

OTHER PUBLICATIONS

Flexera "Flexera Software Solutions for Connecting Current to Cloud Application Producer and Enterprise Solutions to Transition to the Cloud" https://www.flexerasoftware.com/enterprise/products/cloud-solutions; retrieved from internet Jun. 27, 2017; pp. 2.

Flexera "FlexNet OperationsEntitlement Management for Managing the Software License Lifecycle and Use Rights for Apps on Devices" https://www.flexerasoftware.com/products/software-monetization/flexnet-operations; retrieved from internet Jun. 27, 2017; pp. 2.

Anonymous "The Raft Consensus Algorithm" https://raft.github.io/ retrieved from internet Jun. 27, 2017; pp. 1.

\* cited by examiner

COMPUTER SYSTEM PROVIDING VIRTUAL COMPUTING SESSION LICENSE DISTRIBUTION FEATURES AND RELATED METHODS

TECHNICAL FIELD

This application generally relates to computer networks, and more particularly to managing virtual sessions in conjunction with server-based and cloud computing environments and related methods.

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, along with additional computing devices to provide management and customer portals for the cloud system.

Cloud systems may dynamically create and manage virtual machines for customers over a network, providing remote customers with computational resources, data storage services, networking capabilities, and computer platform and application support. For example, a customer in a cloud system may request a new virtual machine having a specified processor speed and memory, and a specified amount of disk storage. Within the cloud system, a resource manager may select a set of available physical resources from the cloud resource pool (e.g., servers, storage disks) and may provision and create a new virtual machine in accordance with the customer's specified computing parameters. Cloud computing services may service multiple customers with private and/or public components, and may be configured to provide various specific services, including web servers, security systems, development environments, user interfaces, and the like.

One challenge associated with providing virtual computing sessions in both cloud and on-premises server systems is that of ensuring that there are authorized licenses available for each of the virtual computing sessions, and that a "double entitlement" situation is not created where a given license is improperly used for different virtual computing sessions at the same time.

SUMMARY

A system may include a license publishing server and a plurality of licensing servers arranged in a cluster an configured to communicate with the license publishing server to obtain a given number of authorized licenses for virtual computing sessions associated with the cluster. The system may also include a plurality of virtualization servers configured to obtain authorized licenses from the plurality of licensing servers and run virtual computing sessions for client computing devices based upon the authorized licenses. The licensing servers may cooperate with one another to distribute licenses to the virtualization servers based upon a consensus protocol and the given number of authorized licenses associated with the cluster.

More particularly, each of the license servers may be fingerprinted to define a unique instance identifier, and the licensing servers may cooperate to compile a cluster membership list based upon the unique instance identifiers of the license servers. Moreover, the license publishing server may be configured to associate the authorized licenses for the virtual computing sessions with the cluster membership list. The licensing servers may cooperate to elect a leader licensing server, and the leader licensing server may accordingly negotiate with the license publishing server to bind the authorized licenses to the cluster membership list. Additionally, the leader licensing server may request fulfillment of the authorized licenses from the license publishing server, and notify the remaining licensing servers in the cluster of the fulfillment request. And upon election of a new leader licensing server, the new leader licensing server may re-request fulfillment from the license publishing server when the fulfillment request remains unacknowledged.

In accordance with one example aspect, the licensing publishing server may encrypt the licenses based upon a private key associated with the licensing server and the cluster membership list. Additionally, the leader licensing server may further send a cluster membership change request to the license publishing server to change the cluster from a first configuration of licensing servers to a second configuration of licensing servers different than the first configuration. Moreover, the licensing servers of the first configuration may enter a joint consensus with the licensing servers of the second configuration in which a majority consensus of licensing servers from the first configuration and from the second configuration initiate the cluster change request By way of example, the virtual computing sessions may comprise virtual desktop sessions, virtual application sessions, etc.

A related method is also provided which may include communicating between a plurality of licensing servers arranged in a cluster and a license publishing server to obtain a given number of authorized licenses for virtual computing sessions associated with the cluster. The method may further include obtaining authorized licenses from the plurality of licensing servers at a plurality of virtualization servers, and running virtual computing sessions for client computing devices based upon the authorized licenses. The licensing servers may cooperate with one another to distribute licenses to the virtualization servers based upon a consensus protocol and the given number of authorized licenses associated with the cluster.

A related non-transitory computer-readable medium is also provided. The medium may have computer-executable instructions for causing a licensing server to perform steps including communicating with other licensing servers arranged in a cluster and a license publishing server to obtain a given number of authorized licenses from the license publishing server for virtual computing sessions associated with the cluster, and cooperating with the other licensing servers to distribute the authorized licenses to a plurality of virtualization servers based upon a consensus protocol and the given number of authorized licenses associated with the cluster.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
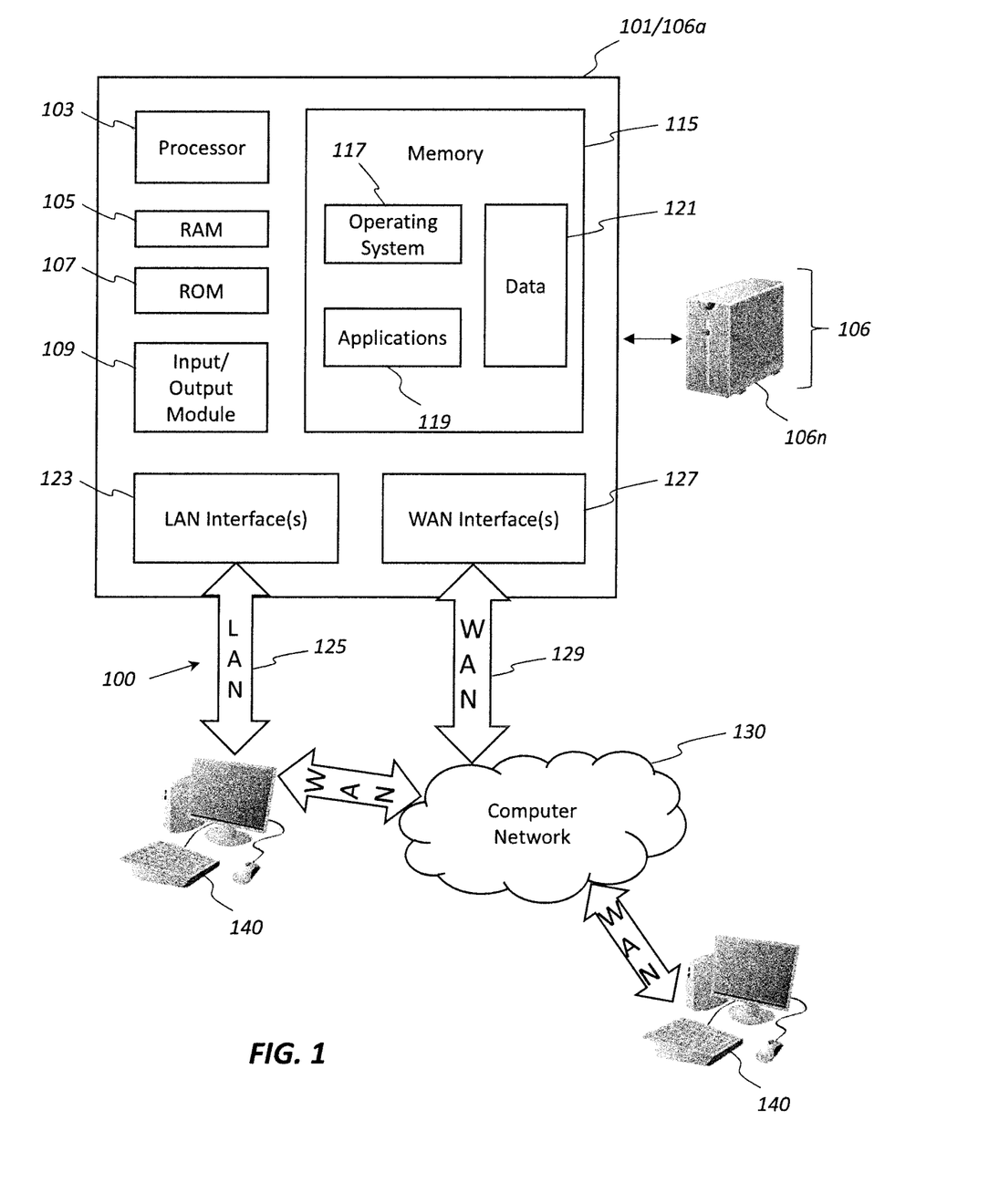
FIG. 1 is a schematic block diagram of an example operating environment in which various aspects of the disclosure may be implemented.

FIG. 1 illustrates an example block diagram of a generic computing device, which in the illustrated example is a computer server 106a, in an example computing environment 100. According to one or more aspects, the server 106a may be a single-server or multi-server desktop virtualization system (e.g., a cloud system) configured to provide virtual machines for client access devices. The server 106a illustratively includes a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling the server 106a to perform various functions. For example, memory 115 may store software used by the server 106a, such as an operating system 117, application programs 119, and an associated database 121. Alternatively, some or all of the computer executable instructions for the server 106a may be embodied in hardware or firmware (not shown).

The server 106a may operate in a networked environment supporting connections to one or more remote computers, such as terminals 140 (also referred to as client or user devices). The terminals 140 may be personal computers or servers that include many or all of the elements described above with respect to the server 106a. The network connections depicted in FIG. 1 include a local area network (LAN) 125 and a wide area network (WAN) 129, but may also include other networks. When used in a LAN networking environment, the server 106a may be connected to the LAN 125 through a network interface or adapter 123. When used in a WAN networking environment, the server 106a may include a modem 127 or other network interface for establishing communications over the WAN 129, such as computer network 130 (e.g., the Internet). It will be appreciated that the network connections shown are illustrative and other means of establishing a communications link between the computers may be used.

The generic computing device and/or terminals 140 may also be mobile terminals (e.g., mobile phones, smartphones, PDAs, notebooks, etc.) including various other components, such as a battery, speaker, and antennas (not shown) in some embodiments.

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In embodiments utilizing XENAPP or XENDESKTOP from Applicant Citrix systems, CITRIX RECEIVER is client software that provides access to XENDESKTOP and XENAPP installations. To provide a centralized virtual computing experience that is similar to that of a local computer to end users, Citrix HDX Adaptive Transport provides an enhanced user experience, regardless of network conditions, LAN, or a high-latency WAN. A large portion of the functionality and communication between the XENAPP Plugin/Receiver and XENAPP Server is facilitated by HDX via virtual traffic channels. Such virtual traffic channels may be used for graphics, disks, COM ports, LPT ports, printers, audio, video, smart card or even third-party custom virtual traffic channels, for example. A virtual channel may include a client-side virtual driver that communicates with a server-side application. XENAPP not only provides for standardized virtual channels, but also allows for customers or third-party vendors to create their own virtual channels by using one of the provided Software Development Kits (SDKs). Virtual channels provide a secure way to accomplish a variety of tasks, for example, an application running on a XENAPP Server communicating with a client-side device or an application communicating with the client-side environment.

On the client side, virtual channels correspond to virtual drivers; each providing a specific function. Some are required for normal operation, and others are optional. Virtual drivers operate at the presentation layer protocol level. There may be a number of these protocols active at any given time by multiplexing channels that are provided by the WinStation protocol layer.

The following is a list of client virtual driver files for respective types of traffic provided within the HDX framework, and their respective function as used by the XENAPP Plugins/Receiver for Windows which are in the form of Dynamic Link Libraries (user mode):

vd3dn.dll—Direct3D Virtual Channel used for Desktop Composition Redirection
vdcamN.dll—Bi-directional Audio
vdcdm30n.dll—Client Drive Mapping
vdcom30N.dll—Client COM Port Mapping
vdcpm30N.dll—Client Printer Mapping
vdctn.dll—ICA Controls Channel
vddvc0n.dll—Dynamic virtual channel
vdeuemn.dll—End User Experience Monitoring
vdflash2.dll (vdflash.dll)—Flash virtual channel
vdgusbn.dll—Generic USB Virtual channel
vdkbhook.dll—Transparent Key Pass-Through
vdlfpn.dll—Framehawk Display channel over UDP like transport
vdmmn.dll—Multimedia Support
vdmrvc.dll—Mobile Receiver Virtual channel
vdmtchn.dll—Multi-Touch support
vdscardn.dll—Smartcard support
vdsens.dll—Sensors virtual channel
vdspl30n.dll—Client UPD
vdsspin.dll—Kerberos
vdtuin.dll—Transparent UI
vdtw30n.dll—Client ThinWire
vdtwin.dll—Seamless
vdtwn.dll—Twain However, it should be noted that different types of traffic and/or channels may be used in various configurations, and that systems other than XENAPP/XENDESKTOP may be used as well.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiments be referred to as a single client machine 140 or a single group of client machines 140, while server(s) 106 may be referred to as a single server 106 or a single group of servers 106. In one embodiment, a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); user device(s); local machine; remote machine; client node(s); endpoint(s); or endpoint node(s). The server 106, in some embodiments, may be referenced by any one of the following terms: server(s), local machine; remote machine; server farm(s), or host computing device(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

Still other embodiments include a client device 140 that displays application output generated by an application remotely executing on a server 106 or other remotely located machine. In these embodiments, the client device 140 may execute a client agent application to display the output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106a-106n such that the servers 106a-106n are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106a-106n within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS, manufactured by Microsoft Corp. of Redmond, Wash., UNIX, LINUX, or MAC OS). In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. Some embodiments include a first server 106 a that receives requests from a client machine 140, forwards the request to a second server 106n, and responds to the request generated by the client machine 140 with a response from the second server 106n. The first server 106a can acquire an enumeration of applications available to the client machine 140 as well as address information associated with an application server 106 hosting an application identified within the enumeration of applications. The first server 106a can then present a response to the client's request using a web interface, and communicate directly with the client 140 to provide the client 140 with access to an identified application.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments may include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include but are not limited to: a bus network topology; a star network topology; a ring network topology; a repeater-based network topology; or a tiered-star network topology. Additional embodiments may include a network of mobile telephone networks that use a protocol to communicate among mobile devices, where the protocol may include, but is not limited to: AMPS; TDMA; CDMA; GSM; GPRS UMTS; or any other protocol able to transmit data among mobile devices.

FIG. 1 shows a high-level architecture of an illustrative desktop virtualization system. As shown, the desktop virtualization system may be a single-server, multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 2:
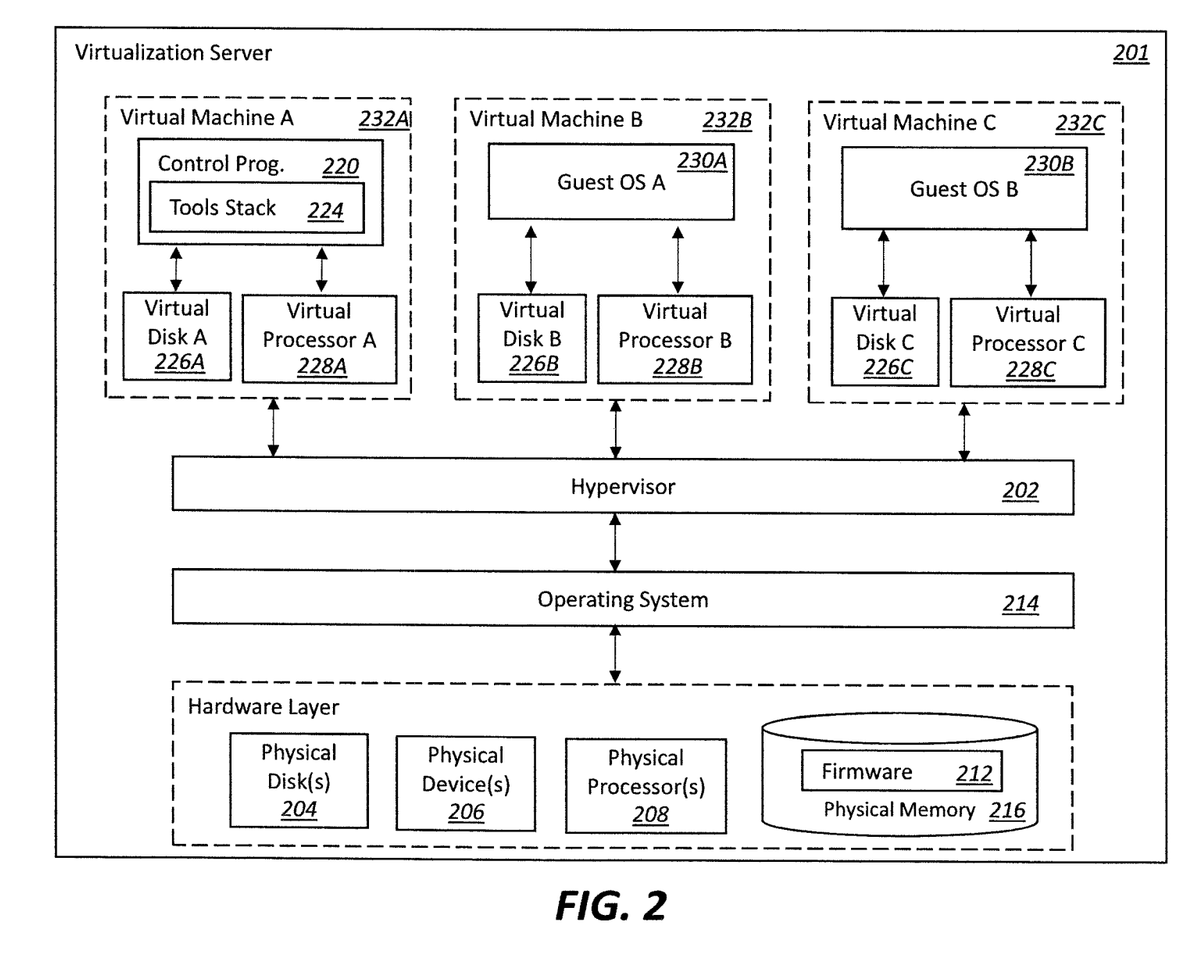
FIG. 2 is a schematic block diagram of an example virtualization server in accordance with one or more illustrative aspects described herein.

Illustrated in FIG. 2 is one embodiment of a computer device 201 configured as a virtualization server in a virtualization environment, for example, a single-server, multi-server, or cloud computing environment. The virtualization server 201 illustrated in FIG. 2 can be deployed as and/or implemented by one or more embodiments of the server 106 illustrated in FIG. 1 or by other known computing devices. Included in virtualization server 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The virtualization server 201 may further include an operating system 214 that may be stored in a memory element in the physical memory 216 and executed by one or more of the physical processors 208. Still further, a hypervisor 402 may be stored in a memory element in the physical memory 216 and can be executed by one or more of the physical processors 208. Executing on one or more of the physical processors 208 may be one or more virtual machines 232A-C (generally 232). Each virtual machine 232 may have a virtual disk 226A-C and a virtual processor 228A-C. In some embodiments, a first virtual machine 232A may execute, on a virtual processor 228A, a control program 220 that includes a tools stack 224. In other embodiments, one or more virtual machines 232B-C may be executed, on a virtual processor 228B-C, a guest operating system 230A-B.

Furthermore the virtualization server 201 may include a hardware layer 210 with one or more pieces of hardware that communicate with the virtualization server 201. In some embodiments, the hardware layer 210 can include one or more physical disks 204, one or more physical devices 206, one or more physical processors 208, and one or more memory 216. Physical components 204, 206, 208, and 216 may include, for example, any of the components described above with respect to FIG. 1. For instance, physical disks 204 may include permanent memory storage, temporary memory storage, disk drives (e.g., optical, floppy, tape), hard disks, external hard drives, flash memory, network-attached storage, a storage-area network, or any other storage repository that the virtualization server 201 can access. Physical devices 206 may include any device included in the virtualization server 201 and/or any combination of devices included in the virtualization server 201 and external devices that communicate with the virtualization server 201. A physical device 206 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 201. The physical memory 216 in the hardware layer 210 may include any type of memory. The physical memory 216 may store data, and in some embodiments may store one or more programs, or set of executable instructions. FIG. 2 illustrates an embodiment where firmware 212 is stored within the physical memory 216 of the virtualization server 201. Programs or executable instructions stored in the physical memory 216 can be executed by the one or more processors 208 of the virtualization server 201.

Virtualization server 201 may also include a hypervisor 202. In some embodiments, hypervisor 202 may be a program executed by processors 208 on the virtualization server 201 to create and manage any number of virtual machines 232. The hypervisor 202 can be referred to as a virtual machine monitor, or platform virtualization software. In some embodiments, a hypervisor 202 can be any combination of executable instructions and hardware that monitors virtual machines executing on a computing machine. Hypervisor 202 may be a Type 2 hypervisor, or a hypervisor that executes within an operating system 214 executing on the virtualization server 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 201 in a virtualization environment may include a Type 1 hypervisor (Not Shown). A Type 1 hypervisor may execute on the virtualization server 201 by directly accessing the hardware and resources within the hardware layer 210. That is, while a Type 2 hypervisor 202 accesses system resources through a host operating system 214, a Type 1 hypervisor may directly access all system resources without needing a host operating system 214. A Type 1 hypervisor may execute directly on one or more physical processors 208 of the virtualization server 201, and may include program data stored in the physical memory 216.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices 206; physical disks; physical processors; physical memory 216 and any other component included in the virtualization server 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the virtualization server 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 201 executes a hypervisor 202 that creates a virtual machine platform on which guest operating systems may execute. In these embodiments, the virtualization server 201 can be referred to as a host server. An example of such a virtualization server is XEN SERVER provided by Citrix Systems. Virtual app and desktop sessions may further be provided by XENAPP AND XENDESKTOP, also from Citrix Systems. XENAPP is an application virtualization solution that enhances productivity with universal access to virtual apps, desktops, and data from any device. XENDESKTOP incorporates the same functionality as XenApp, plus the option to implement a scalable VDI solution.

The hypervisor 202 may create one or more virtual machines 232B-C (generally 232) in which guest operating systems 230 execute. In some embodiments, the hypervisor 202 may load a virtual machine image to create a virtual machine 232. In other embodiments, the hypervisor 202 may execute a guest operating system 230 within the virtual machine 232. In still other embodiments, the virtual machine 232 may execute the guest operating system 230.

In addition to creating virtual machines 232, the hypervisor 202 may control the execution of at least one virtual machine 232. In other embodiments, the hypervisor 202 may present at least one virtual machine 232 with an abstraction of at least one hardware resource provided by the virtualization server 201 (e.g., any hardware resource available within the hardware layer 210). In other embodiments, the hypervisor 202 may control the manner in which virtual machines 232 access the physical processors 208 available in the virtualization server 201. Controlling access to the physical processors 208 may include determining whether a virtual machine 232 should have access to a processor 208, and how physical processor capabilities are presented to the virtual machine 232.

As shown in the example of FIG. 2, the virtualization server 201 may host or execute one or more virtual machines 232. A virtual machine 232 is a set of executable instructions that, when executed by a processor 208, imitate the operation of a physical computer such that the virtual machine 232 can execute programs and processes much like a physical computing device. While FIG. 2 illustrates an embodiment where a virtualization server 201 hosts three virtual machines 232, in other embodiments, the virtualization server 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 202 may create one or more unsecure virtual machines 232 and one or more secure virtual machines 232. Unsecure virtual machines 232 may be prevented from accessing resources, hardware, memory locations, and programs that secure virtual machines 232 may be permitted to access. In other embodiments, the hypervisor 202 may provide each virtual machine 232 with a substantially similar virtual view of the physical hardware, memory, processor and other system resources available to the virtual machines 232.

Each virtual machine 232 may include a virtual disk 226A-C (generally 226) and a virtual processor 228A-C (generally 228.) The virtual disk 226, in some embodiments, is a virtualized view of one or more physical disks 204 of the virtualization server 201, or a portion of one or more physical disks 204 of the virtualization server 201. The virtualized view of the physical disks 204 can be generated, provided, and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the virtualization server 201. In some embodiments, the virtualized view of the physical processors 208 can be generated, provided, and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

Figure 3:
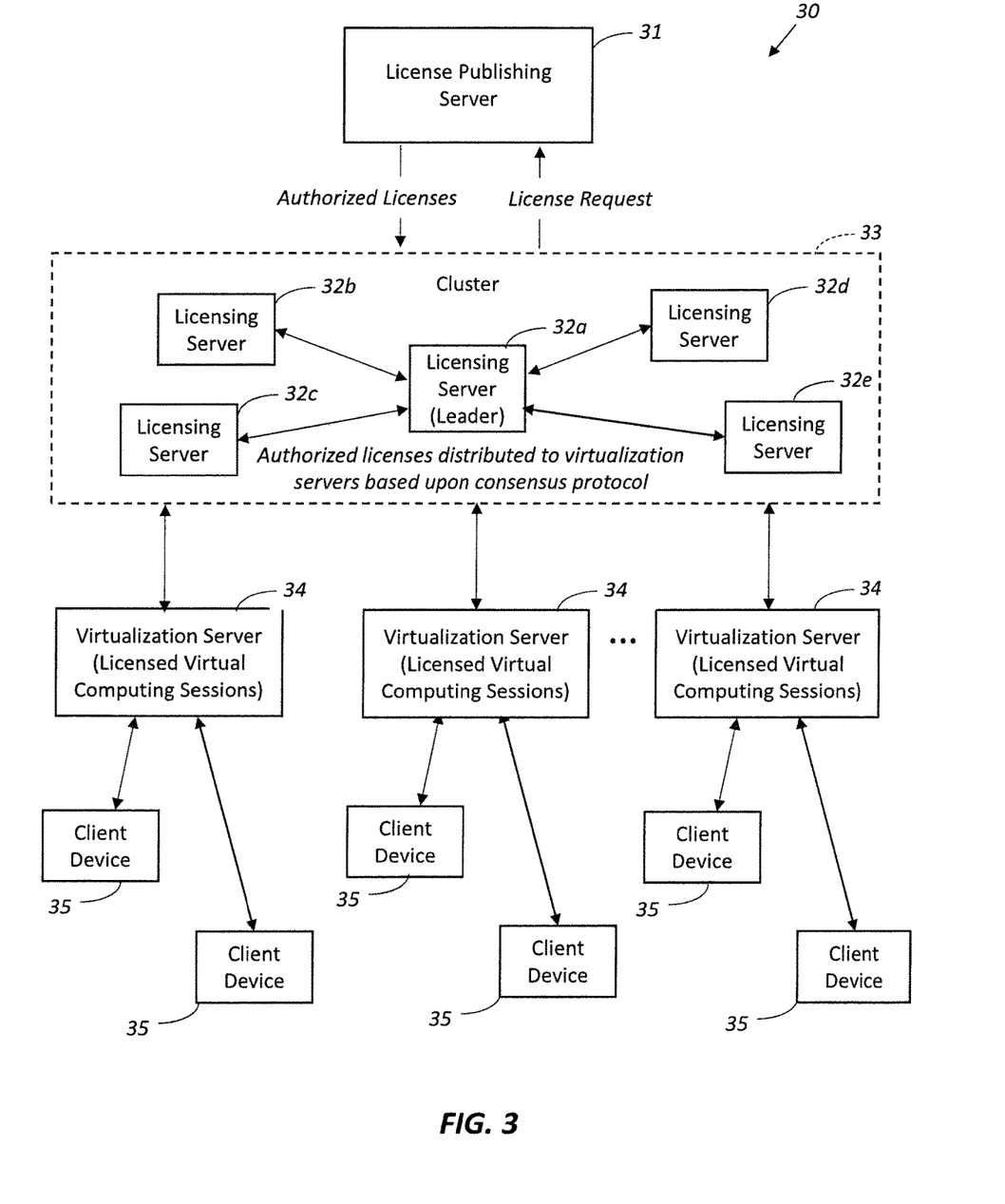
FIG. 3 is a schematic block diagram of a virtual computing system in accordance with an example embodiment which utilizes a consensus protocol among a cluster of licensing servers to distribute licenses for virtual computing sessions to virtualization servers.
Figure 4:
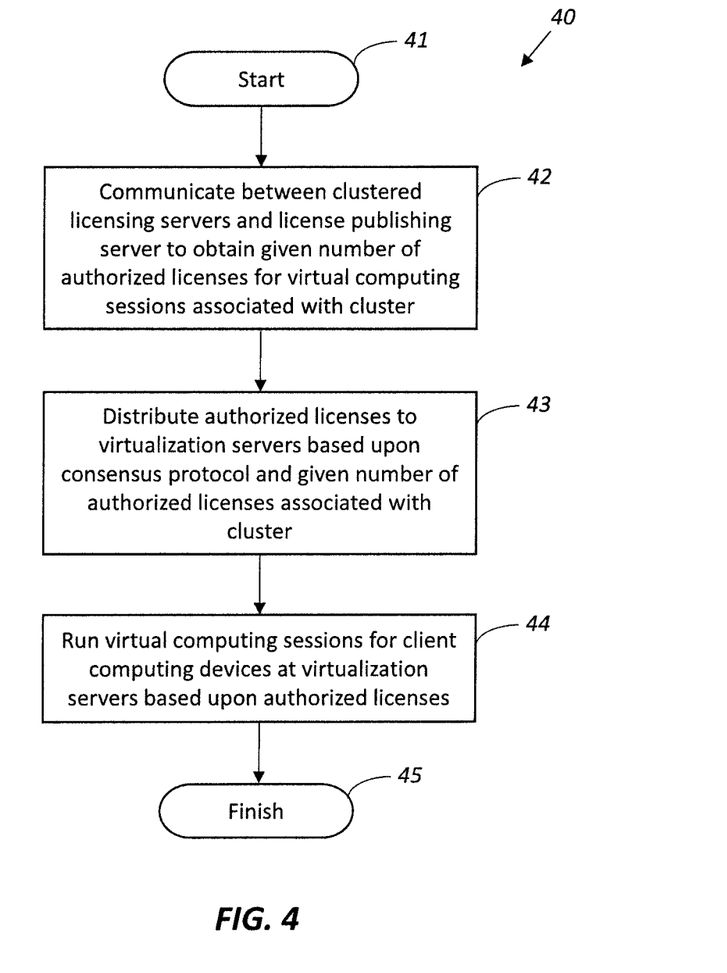
FIG. 4 is a flow diagram illustrating method aspects associated with the system of FIG. 3.

Turning now to FIG. 3 and the flow diagram 40 of FIG. 4, a virtual computing system 30 and associated method aspects are first described. As noted above, managing licenses for virtual computing sessions may be challenging, as virtualization servers for a given corporation or organization may be geographically distributed among different locations, and/or partitioned from one another. While certain approaches are available for binding licenses to a given server instance, there are limits to the capabilities of such approaches. For example, such approaches typically have either a single point of failure, an active/passive client server model, or a limited fixed server redundancy approach that is inflexible with significant administrative overhead and downtime when a server cluster configuration changes.

To address the problem of "double entitlement", that is where more than one user gets the benefit of a single user license by mistake, typical licensing approaches in untrusted environments either lock entitlements to a single node, or a fixed number of nodes that are difficult to change dynamically. However, these approaches generally require administration and downtime interventions through the licensing lifecycle, which may require a significant amount of personnel time and/or system down time. Moreover, when used in a clustered licensing server environment, minimizing portability of licenses by node locking and service continuity by replication in the cluster becomes counterproductive, as this may actually lead to double entitlement in such configurations since the same licensing information gets copied to multiple servers that do not necessarily know what licenses have been distributed by the other servers in the cluster.

Beginning at Block 41, the system 30 illustratively includes a license publishing server 31, and a plurality of licensing servers 32a-32e arranged in a cluster 33. As will be discussed in greater detail below, the licensing servers 32a-32e are configured to communicate with one another and the license publishing server 31 to obtain a given number (e.g., a maximum number) of authorized licenses for virtual computing sessions associated with the cluster 33, at Block 43. The system 30 also illustratively includes a plurality of virtualization servers 34 (which may be similar to the virtualization server 201 discussed above).

The licensing servers 32a-32e distribute the authorized licenses to the virtualization servers 34 based upon a consensus protocol and the given number of authorized licenses associated with the cluster 33, at Block 43. This advantageously makes sure that all of the licensing servers 32a-32e are in agreement as to whether the maximum number of licenses has been used up before additional licenses are granted, and thus avoiding a "double entitlement" situation where an organization gets the benefit of more licenses than it has paid for. Once the authorized licenses are distributed to the appropriate virtualization servers 34, the virtualization servers may accordingly run virtual computing sessions (e.g., virtual desktop and/or virtual app sessions) for client computing devices 35 based upon the authorized licenses, at Block 44. This concludes the method illustrated in FIG. 4 (Block 45).

Figure 5A:
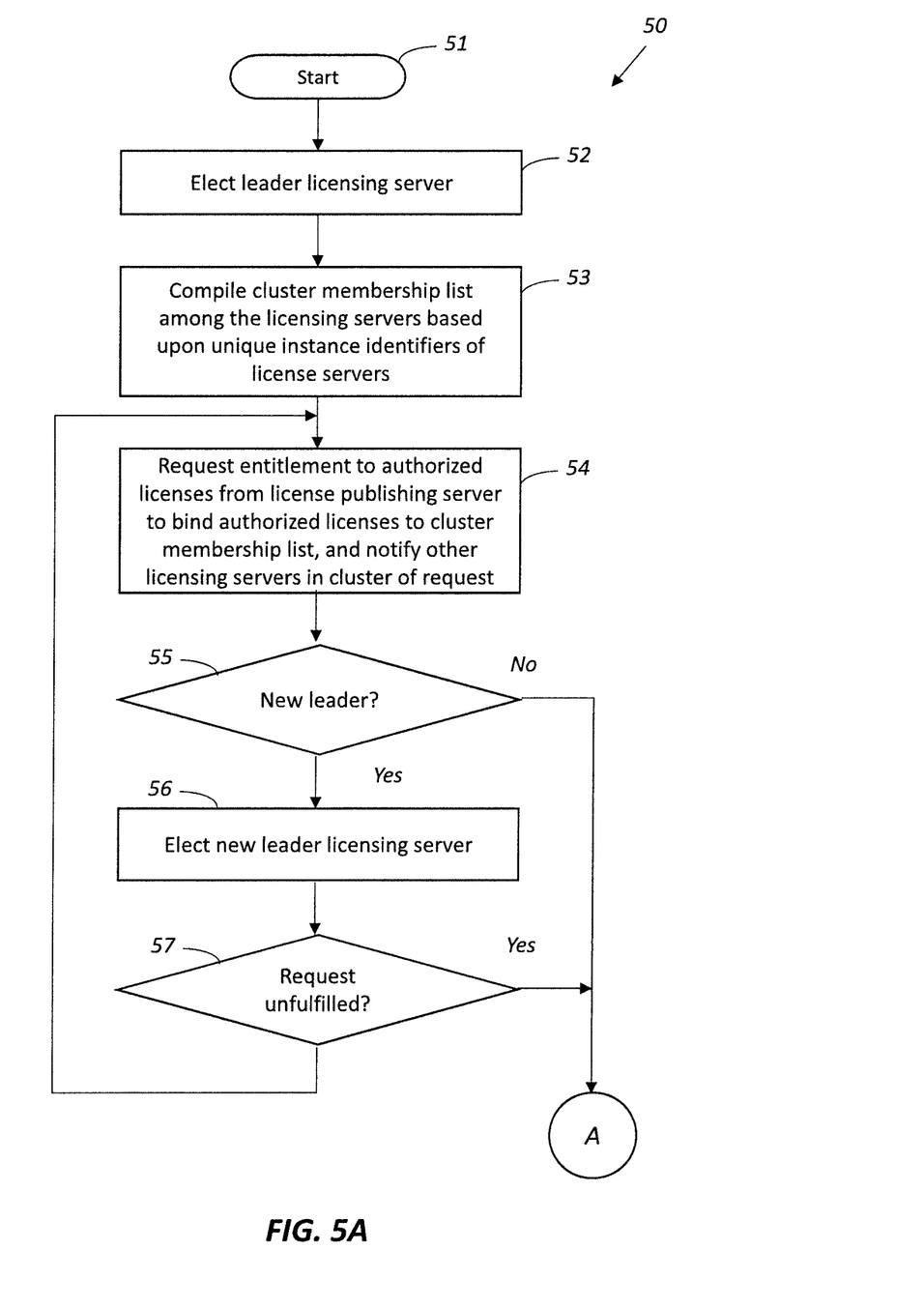
FIGS. 5A and 5B are the upper and lower parts of a flow diagram, respectively, illustrating further method aspects associated with the system of FIG. 3.
Figure 5B:
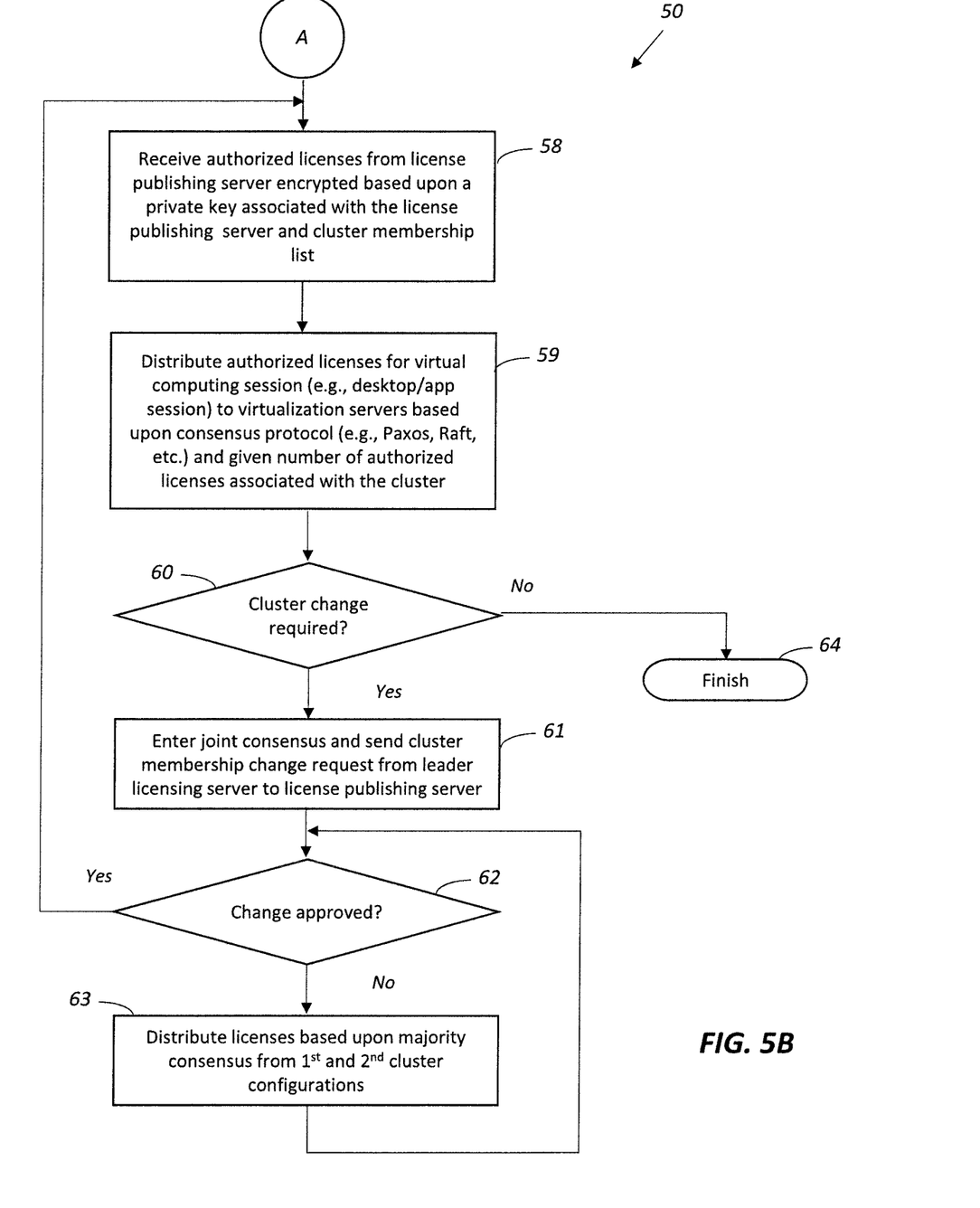

Referring additionally to the flow diagram 50 which is split between FIGS. 5A and 5B, the process begins (Block 51) by setting up instances of the licensing servers 32a-32e in the cluster 33. It should be noted that the licensing servers 32a-32e may be implemented using physically separate hardware, or may be implemented with shared server hardware. For example, in some embodiments, one or more licensing servers 32a-32e may be implemented in the same server "box" with one or more virtualization servers 34. It should also be noted that the licensing servers 32a-32 need not be geographically co-located. For example, the may be associated with a same corporation or organization, yet be physically located at different geographical facilities and communicate via a wide area network or the Internet, for example.

Each licensing server 32a-32e may be identified by a unique identifier. More particularly, the licensing servers 32a-32e may be "fingerprinted" to arrive at a unique instance identifier (UID) using conventional techniques. This UID may accordingly be used to identify members of the cluster 33, and votes by the licensing servers 32a-32e in accordance with consensus protocol may be associated with respective UIDs.

The licensing servers 32a-32e, which are set up in a cluster and operating based upon a consensus protocol as noted above, may elect a leader (Block 52), which in the example illustrated in FIG. 3 is the licensing server 32a. Election of the leader licensing server 32a may be performed in accordance with the particular consensus protocol being used for the given implementation. By way of example, one example consensus protocol which may be used with the system 30 is Paxos and its variants. Another example consensus protocol which may be used is Raft, and for the purposes of the present example it will be assumed that Raft is used as the underlying consensus protocol, as well as to perform certain additional operations when communicating with the licensing publishing server 31, which is outside of the cluster 33. However, other suitable consensus protocols may also be used in different embodiments. If a given licensing server 32a-32e finds any trust or binding break, the server may elect out and stop voting, for example, in accordance with the given consensus protocol being used.

The licensing servers 32a-32e may cooperate to compile a cluster membership list based upon their respective UIDs, at Block 53. Communications between the licensing servers 32a-32e may be encrypted, as well as communications between the cluster 33 and the license publishing server 31, and between the cluster 33 and the virtualization servers 34 using different respective encryption key pairs as appropriate. The cluster membership list may be signed using the appropriate key by the leader licensing server 32a, and the leader licensing server requests fulfillment of authorized licenses for the cluster 33 to be fulfilled from the license publishing server 31 by passing along a signed membership list, at Block 54. The leader licensing server 32a may also notify the remaining licensing servers 32b-32c of the request as well, so that the request may still be fulfilled in the event the leader licensing server thereafter experiences an outage, as will be discussed further below.

The license publishing server 31, (which may be in a publisher backoffice, for example) verifies the requests from the leader licensing server 32a, and if verified the publisher signs a license with the entitlement associated to the membership list passed by the leader licensing server. The leader licensing server 32a, upon receiving the response from the licensing publishing server, commits the transaction on the other nodes or licensing servers 32b-32e so that they may cooperate to distribute the authorized licenses to the virtualization servers 34, at Blocks 58-59.

As noted above, if the leader licensing server 32a goes down before the transaction commits since the licensing publishing server 31 has fulfilled the authorized licenses for the cluster 33, this may be problematic. To account for such situations, a two-phase commit procedure may be used by first committing a transaction on the cluster that signifies initiation of a fulfillment request cycle. More particularly, if the leader licensing server 32a goes down and a new leader gets elected, at Blocks 55-56, the new leader will wake up and see the prior unacknowledged fulfillment request made by the leader licensing server 32a, and will accordingly resend the request to the license publishing server 31, at Block 57. Since the fulfillment operations may be idempotent, there is no problem with respect to licensing servers 32b-32e that got a response, woke up, and received it again. Once an acknowledgement (ack) from the licensing publishing server 31 is committed, the license pools for the licensing servers 32b may then be updated, and the authorized licenses served to the virtualization servers 34 so that they may in turn provide licensed virtual computing sessions to the client devices 35.

In some instances, a cluster membership change may be required, at Block 60. By way of example, this may be necessary to replace hardware within the cluster 33, which may in turn change the UID associated with one or more of the licensing servers 32a-32e. In such cases, a membership change initiation is committed, and a joint consensus may be entered (Block 61) which requires majority approval in both the original and new clusters for a commit. As noted above, this may be implemented using a Raft protocol, along with additional steps for entitlements to lock to new cluster membership.

More particularly, entering a joint consensus results in a request for the cluster configuration change being sent to the licensing publisher server 31, and the leader licensing server 31 waits for an acknowledgement commit from the licensing publisher server. Each licensing server may keep a track of fulfilment requests, so that if it finds itself as the new leader and has not sent the request it sends a request and commits an ack. At this point, the old configuration is still working, but neither of the cluster configurations may make a unilateral decision (Block 63). The ack commit from the license publishing server 31 is received before committing to the new cluster configuration (Block 62). Once the new cluster configuration is committed, any licensing servers associated with the old cluster and not the new cluster may back off themselves, and the new cluster configuration may then make future decisions on its own in accordance with the given consensus protocol being used. The method illustratively concludes at Block 64. It should be noted that various steps may be performed in a different order than those shown in the illustrated example in different embodiments.

In contrast to existing approaches that bind a license to a single server by way of a unique instance identifier and allows detection when the binding is broken, the above-described approach advantageously augments single server binding of licenses with the ability to bind to a cluster membership list. Yet, this is done while keeping the unique instance identification and binding break detection in place. Bindings are broken at a single server in isolation once applied, but the licenses are advantageously associated with the cluster membership list. As a result, validation of members is done by matching the unique identity of the node against the membership list in the entitlement. Communication from members not in the list is ignored.

Furthermore, double entitlement may advantageously be avoided with the consensus protocol's leader election, as the leader licensing server 32a becomes the node that serves a license based upon a consensus from the remaining licensing servers 32b-32e. Additionally, using the unique instance identifiers as cluster member identifiers for consensus protocol exchanges advantageously provides a security and tampering detection proxy, along with an ID for addressing nodes.

With respect to tampering and security concerns, the cluster membership list may be cryptographically secured by publisher keys and validated at nodes such that tampering with it is prevented. Communication between nodes may be validated against node identifiers and cryptographically secured by publisher keys. Furthermore, communication with the virtualization servers 34 may also be secured as in single node communication, but redirected to the leader licensing server 32a in accordance with the underlying consensus protocol.

Accordingly, the above-described approach advantageously allows for securely replicating licenses in a dynamic server cluster with a reduced risk of double entitlement. More particularly, this approach adapts to cluster membership changes while still operational by leveraging an underlying consensus mechanism with reduced administrative overhead. This approach applies consensus with augmentations to single server license binding technology to arrive at a fault tolerant replicated clustered licensing server configuration that is peer-based and may effectively change cluster membership without double entitlement and revenue loss. Moreover, it leverages advantageous aspects of consensus protocols and single server license binding technology to provide a distributed license management approach.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A system comprising:
a license publishing server;
a plurality of licensing servers arranged in a cluster and configured to communicate with the license publishing server to obtain a given number of authorized licenses for virtual computing sessions associated with the cluster; and
a plurality of geographically distributed virtualization servers configured to obtain authorized licenses from the plurality of licensing servers and run virtual computing sessions for client computing devices based upon the authorized licenses;
wherein the licensing servers are configured to, based upon a consensus protocol,
distribute the authorized licenses to the virtualization servers,
reach an agreement among the licensing servers regarding whether a number of authorized licenses in use across the virtualization servers has exceeded the given number of authorized licenses, and
cease to distribute authorized licenses to the virtualization servers based upon an agreement that the number of authorized licenses in use across the licensing servers has exceeded the given number of authorized licenses;
wherein the licensing servers elect a leader licensing server from among the plurality of licensing servers in accordance with the consensus protocol to negotiate with the license publishing server to obtain the authorized licenses;
wherein the leader licensing server further sends a cluster membership change request to the license publishing server to change the cluster from a first configuration of licensing servers to a second configuration of licensing servers different than the first configuration, and wherein the licensing servers of the first configuration enter a joint consensus with the licensing servers of the second configuration in which a majority consensus of licensing servers from the first configuration and from the second configuration initiate the cluster membership change request.

2. The system of claim 1 wherein each of the license servers is fingerprinted to define a unique instance identifier; wherein the licensing servers compile a cluster membership list based upon the unique instance identifiers of the license servers; and wherein the license publishing server is configured to associate the authorized licenses for the virtual computing sessions with the cluster membership list.

3. The system of claim 2 wherein the leader licensing server negotiates with the license publishing server to bind the authorized licenses to the cluster membership list.

4. The system of claim 3 wherein the leader licensing server requests fulfillment of the authorized licenses from the license publishing server and notifies the remaining licensing servers in the cluster of the fulfillment request; and wherein, upon election of a new leader licensing server, the new leader licensing server re-requests fulfillment from the license publishing server when the fulfillment request remains unacknowledged.

5. The system of claim 2 wherein the licensing publishing server encrypts the licenses based upon a private key associated with a licensing server from among the plurality of licensing servers and the cluster membership list.

6. The system of claim 1 wherein the virtual computing sessions comprise virtual desktop sessions.

7. The system of claim 1 wherein the virtual computing sessions comprise virtual application sessions.

8. A method comprising:
communicating between a plurality of licensing servers arranged in a cluster and a license publishing server to obtain a given number of authorized licenses for virtual computing sessions associated with the cluster;
in accordance with a consensus protocol,
distributing the authorized licenses from the licensing server to a plurality of geographically distributed virtualization servers,
reaching an agreement among the licensing servers regarding whether a number of authorized licenses in use across the virtualization servers has exceeded the given number of authorized licenses,
ceasing to distribute authorized licenses to the virtualization servers based upon an agreement that the number of authorized licenses in use across the licensing servers has exceeded the given number of authorized licenses, and
electing a leader licensing server from among the plurality of licensing servers to negotiate with the license publishing server to obtain the authorized licenses;
running virtual computing sessions for client computing devices at the virtualization server based upon the authorized licenses; and
sending a cluster membership change request from the leader licensing server to the license publishing server to change the cluster from a first configuration of licensing servers to a second configuration of licensing servers different than the first configuration, and entering a joint consensus of the licensing servers of the first configuration with the licensing servers of the second configuration in which a majority consensus of licensing servers from the first configuration and from the second configuration initiate the cluster membership change request.

9. The method of claim 8 wherein each of the licensing servers is fingerprinted to define a unique instance identifier, and further comprising:
compiling a cluster membership list among the licensing servers based upon the unique instance identifiers of the license servers; and
at the license publishing server, associating the authorized licenses for the virtual computing sessions with the cluster membership list.

10. The method of claim 9 further comprising negotiating between the leader licensing server and the license publishing server to bind the authorized licenses to the cluster membership list.

11. The method of claim 10 further comprising:
at the leader licensing server, requesting fulfillment of the authorized licenses from the license publishing server and notifying the remaining licensing servers in the cluster of the fulfillment request;
electing a new leader licensing server; and
re-requesting fulfillment from the license publishing server by the new leader licensing server when the fulfillment request remains unacknowledged.

12. The method of claim 9 further comprising, at the licensing publishing server, encrypting the authorized licenses based upon a private key associated with a licensing server from among the plurality of licensing servers and the cluster membership list.

13. The method of claim 8 wherein the virtual computing sessions comprise at least one of virtual desktop sessions and virtual application sessions.

14. A non-transitory computer-readable medium having computer-executable instructions for causing a licensing server to perform steps comprising:
communicating with other licensing servers arranged in a cluster and a license publishing server to obtain a given number of authorized licenses from the license publishing server for virtual computing sessions run for client computing devices at a virtualization server based upon the authorized licenses;
in accordance with a consensus protocol,
distributing the authorized licenses along with the other licensing servers to a plurality of geographically distributed virtualization servers,
reaching an agreement with the other licensing servers regarding whether a number of authorized licenses in use across the virtualization servers has exceeded the given number of authorized licenses,
ceasing to distribute authorized licenses to the virtualization servers based upon an agreement that the number of authorized licenses in use across the licensing servers has exceeded the given number of authorized licenses, and
cooperating with the other licensing servers to elect itself as a leader licensing server to negotiate with the license publishing server to obtain the authorized licenses; and
sending a cluster membership change request to the license publishing server to change the cluster from a first configuration of licensing servers to a second configuration of licensing servers different than the first configuration;
wherein the licensing servers of the first configuration enter a joint consensus with the licensing servers of the second configuration in which a majority consensus of licensing servers from the first configuration and from the second configuration initiate the cluster membership change request.

15. The non-transitory computer-readable medium of claim 14 wherein each of the licensing servers is fingerprinted to define a unique instance identifier, and further having computer-executable instructions for causing the licensing server to compile a cluster membership list among the licensing servers based upon the unique instance identifiers of the license servers.

16. The non-transitory computer-readable medium of claim 15 further having computer-executable instructions for causing the licensing server to request fulfillment of the authorized licenses from the license publishing server based upon the cluster membership list, and notify the remaining licensing servers in the cluster of the fulfillment request.

\* \* \* \* \*